United States Patent [19]

Kramer

[11] Patent Number: 4,520,664
[45] Date of Patent: Jun. 4, 1985

[54] TIRE PRESSURE INDICATOR

[76] Inventor: Robert Kramer, 23417 Mary, Taylor, Mich. 48180

[21] Appl. No.: 498,420

[22] Filed: May 26, 1983

[51] Int. Cl.³ .......................................... B60C 23/04
[52] U.S. Cl. .................................. 73/146.8; 73/744; 116/34 R
[58] Field of Search ................... 73/146.8, 146.2, 744; 116/34 R

[56] References Cited

U.S. PATENT DOCUMENTS 2,903,888 9/1959 Gföll ................................ 116/34 R
4,362,121 12/1982 Pegram ............................ 116/34 R Primary Examiner—Donald O. Woodiel
Attorney, Agent, or Firm—Barnes, Kisselle, Raisch, Choate, Whittemore & Hulbert

[57] ABSTRACT

A tire pressure indicator for visual observation of tire pressure including a screw-on cartridge containing a spring-biased piston with a movable shield which covers a central indicator pilot when tire pressure is up to requirements. When pressure is below what it should be, the piston retracts to allow the shield to expose indicator pilot to the view of an observer, thus serving as a warning that inflation is required.

4 Claims, 9 Drawing Figures

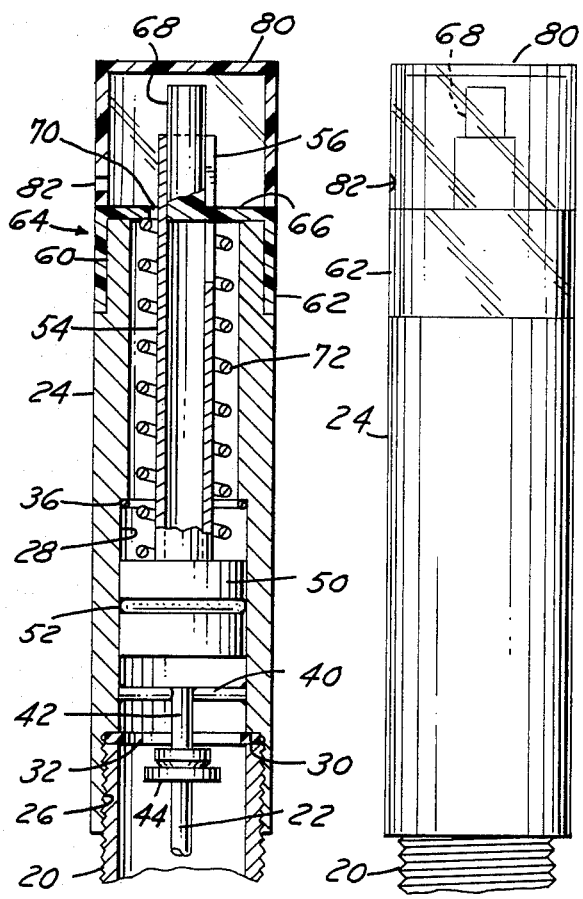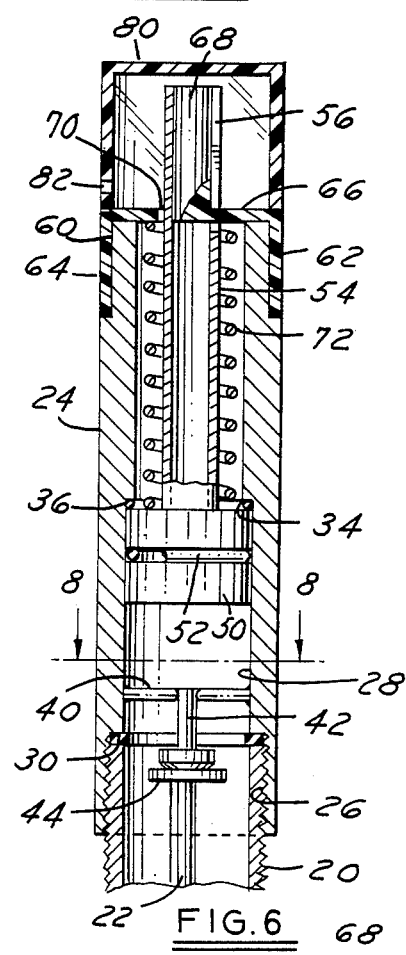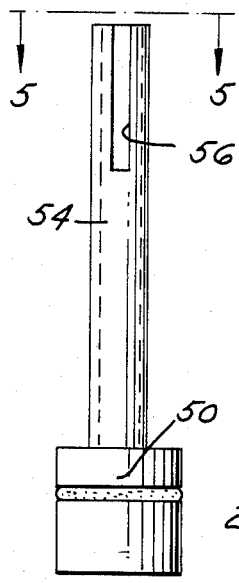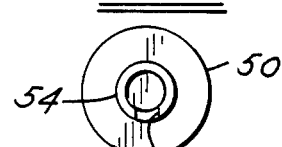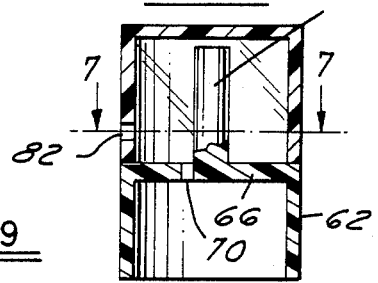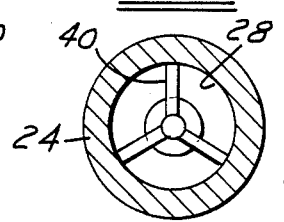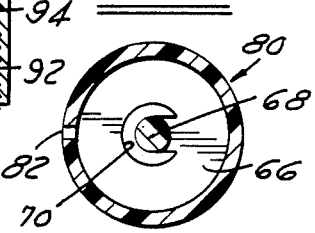

TIRE PRESSURE INDICATOR

FIELD OF INVENTION

Pressure indicators incorporated in the valve stem of a vehicle tire to indicate to an operator the condition of inflation.

BACKGROUND OF INVENTION

As early as 1914 inventors were devising ways for the operator of a motor vehicle to observe the inflation pressure of tires as exemplified in U.S. Pat. No. 1,089,326 to Chilson. More recent examples of pressure indicators are found in U.S. patents to Bordwick, U.S. Pat. No. 3,357,240 (1967), and Yabor, U.S. Pat. No. 3,789,867 (1974). In earlier years, when tires and tubes were formed of natural rubber, they required much more attention relative to inflation since the material was porous and the tires tended to deflate by leakage through the walls. With the more recent use of synthetic rubber and tubeless tires, the tires retain the initial inflated condition for a relatively long time. Under these conditions a vehicle operator tends to become careless about checking his tires.

It is an object of the present invention to provide an inflation indicator which will register "under inflation" at a glance with no need to bend down and read any calibrated scale. A color signal will warn the observer if there is a deflation condition which requires attention.

It is a further object to provide a tire pressure indicator which can be readily mounted on a valve stem in a manner to depress the basic springbiased valve and substitute a secondary seal.

It is a further object to provide an indicator which can be readily removed so that the air supply nozzle to permit inflation can be applied to the standard valve stem.

Additional objects and features of the invention will be apparent in the following description and claims in which the principles of the invention are set forth together with details to enable persons skilled in the art to practice the invention, all in connection with the best mode presently contemplated for the invention.

BRIEF DESCRIPTION OF THE DRAWINGS

Drawings accompany the disclosure and the various views thereof may be briefly described as:

FIG. 1, an outside elevation of the valve stem attachment.

FIG. 2, a vertical section of the assembly of the device.

FIG. 3, a vertical section of the device similar to FIG. 2 showing the parts in a different relative position.

FIG. 4, an elevation of a piston component of the device.

FIG. 5, an end view of the piston shown in FIG. 4.

FIG. 6, a view of the transparent plastic sealing cap.

FIG. 7, a sectional view on line 7—7 of FIG. 6.

FIG. 8, a sectional view on line 8—8 of FIG. 2.

FIG. 9, a view of a modified structure for a primary valve depressor.

DETAILED DESCRIPTION OF THE PRINCIPLES OF THE INVENTION AND THE MANNER AND PROCESS OF USING IT

With reference to the drawings, in FIGS. 1, 2 and 3, the top threaded end of a standard tire valve stem 20 is illustrated showing a standard valve stem 22 which, when depressed, opens the primary valve (not shown).

The pressure indicator, according to the present invention, has a main cylindrical body 24 with a three-step bore. The bottom and largest is the bore 26 which is internally threaded to screw onto the valve stem 20. A second bore 28 terminates at the bottom in a shoulder 30 where an O-ring 32 is located to seal the top of the stem 20. At the top of the bore 28 is a second shoulder 34 which locates an O-ring 36.

At the bottom of the body 24 is a spider 40 (FIGS. 1, 2 and 8) which carries a depending pin 42 on the bottom of which is a small disc 44. This disc will depress the valve stem 22 of the primary valve when body 24 is screwed onto the valve stem 20.

A piston 50 with an O-ring seal 52 is slideable on the bore 28 and has an upstanding, preferably opaque, hollow stem 54 which is axially slotted at the top end 56. This stem serves as a shield for a visual indicator to be described.

The top end of body 24 is reduced in size at 60 to receive a sleeve-like skirt 62 of a cap 64. The cap has a top plate 66 with a central rod-like extension indicator or post 68. Viewed from the top, as in FIG. 7, it will be seen that a C-shaped opening 70 is provided around the indicator post 68. The top plate 66 serves as a spring retainer for coil spring 72 which, at its other end, bears against the piston 50. The slotted end of the piston stem 54 slips through the C-shaped opening 70 in a sliding relationship This end may be colored green.

A dust seal cap 80, formed of transparent plastic, overlies the cap 64 and has an atmospheric vent opening 82. The cap 64 is secured to the main body by a suitable adhesive or sonic welding. Similarly, the transparent cap 80 is secured to cap 64 by an adhesive or sonic welding.

The rod-like indicator post 68 is preferably formed of or covered with a colored material such as red.

The spring 72 can be calibrated for any desired pressure such as 26, 28, 30, etc. pounds per square inch.

IN THE OPERATION

With the parts assembled as shown in FIG. 2, the main body 24 is screwed onto a standard valve stem 20. Disc 44 will press down the standard valve step 22 admitting the tire pressure to the piston 50. If the pressure within the tire can overcome the calibrated spring 72, the piston will move against the spring and up against the seal 36 to provide a secondary seal for the air within the tire. In this position, the opaque hollow stem 54 will be covering the post 68 so that only the green sleeve 54 is visible through the transparent cap 80.

If the pressure in the tire reduces to a point that the calibrated spring 72 can move the piston down, the red indicator post 68 will be exposed so that an observer can see that the tire needs inflation.

FIG. 9 illustrates a modified valve stem depressor in the form of a ring 90 carrying suitable spider arms to support the depending disc 92. An O-ring seal 94 serves to seal the body 24 to the valve stem.

What is claimed is:

1. A visual tire pressure indicator for application to a standard tire valve stem which comprises:
   (a) a hollow body unit to be secured at a first end to a standard valve stem and having at the other end an axially extending indicator post, (b) a pressure responsive means movable within said body to be exposed to the tire pressure and biased against said tire pressure, and (c) shield means on said pressure responsive means extending over said indicator post to shield said post from view in one position of said pressure responsive means and to expose said indicator post in other positions of said pressure responsive means, said body at its other end having a cap telescoping over and secured to said body, and said indicator post projecting axially outward of said cap away from said body.

2. A visual tire pressure indicator as defined in claim 1 in which said pressure responsive means comprises a piston reciprocal in said body having a tubular extension to slide over said indicator post, said indicator post being supported by a radial portion extending from cap, and said tubular extension has an axial slot to accommodate said radial portion.

3. A visual tire pressure indicator as defined in claim 2 in which a compression spring is seated at one end against said piston and at the other end against said cap.

4. A visual tire pressure indicator for application to a standard tire valve stem which comprises:

(a) a hollow body unit to be secured at a first end to a standard valve stem and having at the other end an axially extending indicator post, (b) a pressure responsive means movable within said body to be exposed to the tire pressure and biased against said tire pressure, and (c) shield means on said pressure responsive means extending over said indicator post to shield said post from view in one position of said pressure responsive means and to expose said indicator post in other positions of said pressure responsive means, said pressure responsive means comprising a piston having a top and bottom surface reciprocal in said body from the one position shielding said post from view to other positions exposing said post, a spring biasing the top of said piston in the direction of said first end, the bottom surface of said piston being exposed to tire pressure when installed on a tire valve stem, and annular seal means within and intermediate the ends of said body to contact the top surface of said piston and provide an annular seal around said piston when said piston is in said one position.

* * * * *